United States Patent
Chen et al.

(10) Patent No.: US 7,742,317 B2
(45) Date of Patent: Jun. 22, 2010

(54) PRECHARGING BOOST CONVERTERS IN DC TO DC POWER CONVERTERS

(75) Inventors: Keming Chen, Torrance, CA (US); Douglas S. Carlson, Hawthorne, CA (US); Sung Chung, Fullerton, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 204 days.

(21) Appl. No.: 11/960,253

(22) Filed: Dec. 19, 2007

(65) Prior Publication Data

US 2009/0161389 A1 Jun. 25, 2009

(51) Int. Cl.
*H02M 3/335* (2006.01)
*H02M 7/537* (2006.01)

(52) U.S. Cl. .......................................... 363/16; 363/131
(58) Field of Classification Search .................. 363/16, 363/131, 24
See application file for complete search history.

(56) References Cited

U.S. PATENT DOCUMENTS

| | | | | |
|---|---|---|---|---|
| 5,307,004 | A * | 4/1994 | Carsten | 323/222 |
| 6,239,584 | B1 * | 5/2001 | Jang et al. | 323/222 |
| 6,445,599 | B1 * | 9/2002 | Nguyen | 363/25 |
| 6,906,930 | B2 * | 6/2005 | Jang et al. | 363/17 |
| 6,952,353 | B2 * | 10/2005 | Yan et al. | 363/16 |
| 7,106,605 | B2 * | 9/2006 | Chen et al. | 363/52 |
| 7,116,012 | B2 * | 10/2006 | Kajouke et al. | 307/64 |
| 7,116,087 | B2 * | 10/2006 | Zhang et al. | 323/272 |
| 7,215,560 | B2 * | 5/2007 | Soldano et al. | 363/44 |
| 7,355,868 | B2 * | 4/2008 | Soldano | 363/89 |
| 7,362,077 | B2 * | 4/2008 | Chen | 323/222 |

* cited by examiner

*Primary Examiner*—Shawn Riley
(74) *Attorney, Agent, or Firm*—Ingrassia Fisher & Lorenz, P.C.

(57) ABSTRACT

A method and apparatus for precharging a DC to DC power converter system is provided. The system includes a boost circuit for generating a boosted output voltage from an input voltage. The input voltage is monitored. A predetermined current limit is compared to a current in the boost circuit, and the current limited is increased when the input voltage is greater than a predetermined value.

20 Claims, 2 Drawing Sheets

PRECHARGING BOOST CONVERTERS IN DC TO DC POWER CONVERTERS

TECHNICAL FIELD

The present invention generally relates to systems and methods for precharging boost converters in DC to DC power converters, and more particularly relates to systems and methods for precharging boost converters in DC to DC power converters that reduce the rate of precharge if the voltage source (e.g., a battery) falls below a predetermined threshold.

BACKGROUND

DC to DC power converters are utilized in a number of different electronic devices to boost one DC voltage level to another. One exemplary use is in electric or hybrid automobiles. A DC to DC power converter can be utilized to drive a 320 volt bus from a 12 volt battery, which can be particularly useful to start an electric automobile. While conventional DC to DC power converters have been suitable for boosting the charge of a fully-charged battery to the necessary voltage, conventional DC to DC power converters can cause problems in a system in which a battery that is not fully charged. If the voltage of the battery in an electric automobile drops below a threshold value, it may be difficult to start the vehicle.

Accordingly, it is desirable to provide systems and methods for precharging boost converters in DC to DC power converter systems that reduce the rate of precharge in order to prevent the voltage of a voltage source from dropping below a threshold value. Furthermore, other desirable features and characteristics of the present invention will become apparent from the subsequent detailed description and the appended claims, taken in conjunction with the accompanying drawings and the foregoing technical field and background.

BRIEF SUMMARY

In accordance with an exemplary embodiment, a method is provided for precharging a DC to DC power converter that includes a boost circuit for generating a boosted output voltage from an input voltage. The method includes monitoring the input voltage; comparing a current in the boost circuit to a predetermined current limit; and increasing the current limit when the input voltage is greater than a predetermined value.

In accordance with another exemplary embodiment, a DC to DC power converter system is provided and includes a boost converter circuit having an input configured to receive and boost an input voltage to generate an output voltage based on a current in the boost converter circuit; and a precharge controller coupled to the boost converter and configured to measure the current of the boost converter circuit. The precharge controller is further configured to receive a predetermined current limit, compare the current to the current limit, and control the boost converter circuit based on the comparison of the current to the predetermined current limit. The system includes a microprocessor coupled to the precharge controller and the boost converter, the microprocessor configured to monitor the input voltage, provide the current limit to the precharge controller, and to increase the current limit when the input voltage is above a predetermined value.

In accordance with yet another exemplary embodiment, a DC to DC power converter system is provided and includes a boost converter circuit having an input configured to receive an input voltage. The boost converter circuit includes at least two switches and configured to boost the input voltage into an output voltage based on switch control signals. The system further includes a precharge controller coupled to the boost converter circuit and configured to provide the switch control signals to the boost converter circuit based on a current limit representing a limit on a current in the boost converter circuit and a microprocessor coupled to the precharge controller and configured to provide the current limit to the precharge controller. The microprocessor is further configured to monitor the input voltage, increase the current limit when the input voltage is above a predetermined value, and decrease the current limit when the input voltage is at or below the predetermined value.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in the figures depicts exemplary arrangements of elements, additional intervening elements, devices, features, or components may be present in an embodiment of the depicted subject matter.

Figure 1:
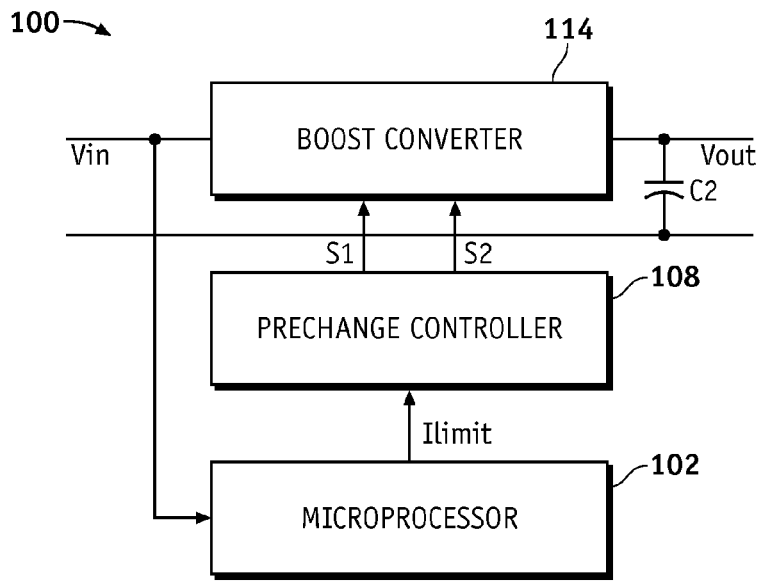
FIG. 1 is a functional block diagram of a DC to DC power converter system in accordance with an exemplary embodiment of the present invention.

FIG. 1 is a functional block diagram of a DC to DC power converter system 100 for boosting an input voltage $V_{IN}$ to an output voltage $V_{OUT}$ in accordance with an exemplary embodiment of the present invention. The system 100 includes a microprocessor 102, a precharge controller 108 coupled to the microprocessor 102, and a boost converter circuit 114 coupled to the precharge controller 108. Ignoring for a moment a monitoring of $V_{IN}$ by the microprocessor shown in FIG. 1, the microprocessor 102 provides a control signal ($I_{LIMIT}$) to the precharge controller 108.

The precharge controller 108 receives $I_{LIMIT}$ and, in response thereto, provides signals for controlling a first switch (S1) 216 (FIG. 4) and a second switch (S1) 218 (FIG. 4) in the boost converter circuit 114. As discussed in further detail below, the input voltage $V_{IN}$ is boosted to the output voltage $V_{OUT}$ input voltage $V_{IN}$ as a result of the manipulation of the switches 216, 218 (FIG. 4) by the precharge controller 108. The voltage source (not shown) that provides $V_{IN}$ can be, for example, an automobile battery. Generally, the switches 216, 218 (FIG. 4) are controlled such that the current in the boost converter circuit 114 does not exceed $I_{LIMIT}$.

Figure 2:
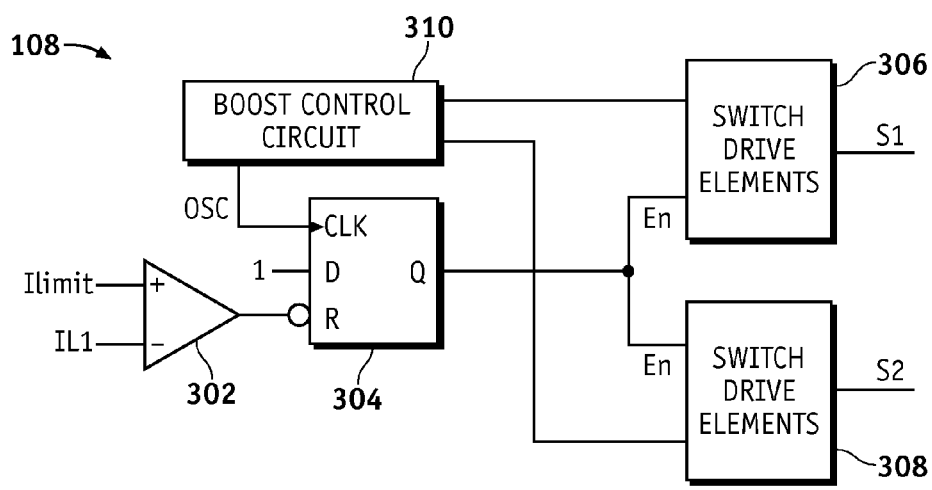
FIG. 2 is a schematic diagram of a precharge controller utilized in the system of FIG. 1.

FIG. 2 is a more detailed view of the exemplary precharge controller 108 utilized in the system of FIG. 1. FIG. 2 is described in association with FIG. 3, which is an exemplary motor start up timing diagram for the precharge controller 108.

Figure 4:
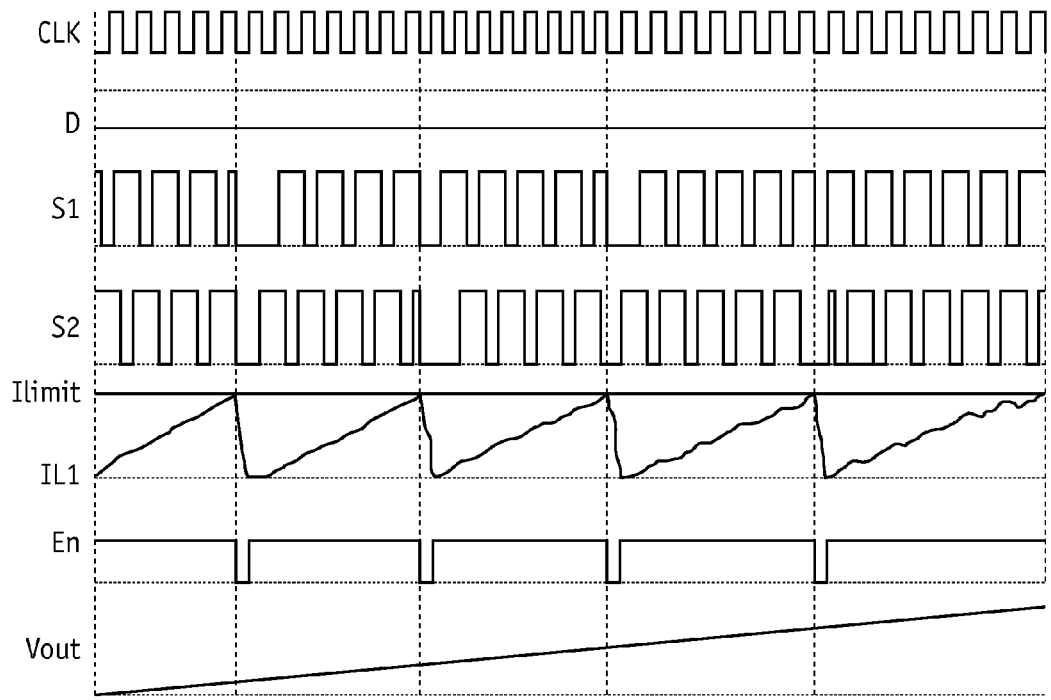
FIG. 4 is a schematic diagram of an isolated boost converter utilized in the system of FIG. 1.

The precharge controller 108 includes a boost control circuit 310 coupled to first and second switch drive elements 306 and 308. The boost control circuit 310 is coupled to switch drive elements 306 and 308, which in turn provide switching signals S1 and S2 to switches 216 and 218 in the boost converter circuit 114 (FIG. 4). As discussed in further detail below, turning the first and second switches 216 and 218 on and off in the boost converter circuit 114 boosts the output voltage $V_{OUT}$, and the rate at which the output voltage $V_{OUT}$ increases is referred to as the "boost rate."

Figure 3:
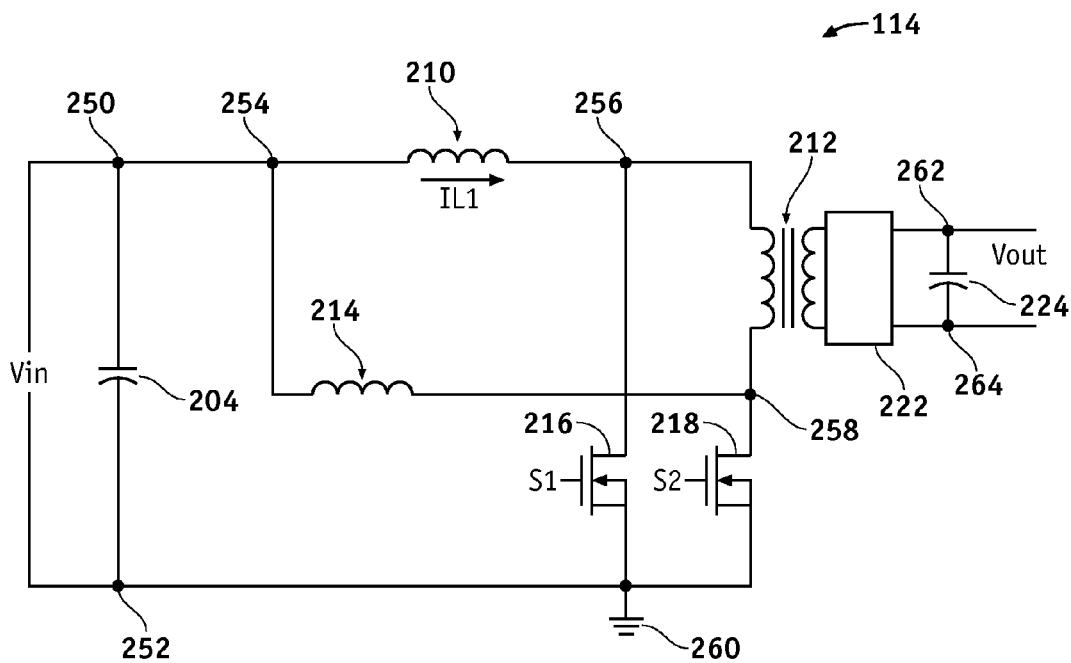
FIG. 3 is a start up timing diagram for the precharge controller of FIG. 2.

The precharge controller 108 additionally includes a comparator 302 having an output coupled to a delay (D) type flip flop circuit 304. $I_{LIMIT}$ and a measured ramp current ($IL_1$) (see FIG. 4) from the boost converter circuit 114 are coupled to inputs of comparator 302, and the output of comparator 302 is coupled to an input of D flip flop 304. D flip flop 304 also receives a clock signal (CLK in FIG. 3) from an oscillator in boost control circuit 310. The output of D flip flop 304 (En in FIG. 3) is coupled to the inputs of switch drive elements 306 and 308. As shown in FIG. 3, during operation, when the ramp current $IL_1$ reaches $I_{LIMIT}$, the enable signals from D flip flop 304 are turned off, and as a result, both switches S1 and S2 and turned off. This results in the ramp current IL1 in the boost converter circuit 114 going to zero. Thereafter, CLK signal from boost control circuit 310 resets the D flip flop 304, and the enable signals are turned back on and the first and second switches 216 and 218 begin switching again. This process is repeated to boost the output voltage $V_{OUT}$.

FIG. 4 is a more detailed view of the exemplary isolated boost converter circuit 114 utilized in the system of FIG. 1. Input voltage $V_{IN}$ is applied across a first node 250 and a second node 252. A first terminal of a first capacitor 204 is coupled to node 250, and a second terminal of the capacitor 206 is coupled to node 252. Node 250 is additionally coupled to a third node 254. One terminal of a first inductor 210 is coupled between node 254, and a second terminal is connected to a fourth node 256, which in turn, is coupled to a primary winding of a transformer 212. A second inductor 214 is coupled between node 254 and a fifth node 258, which in turn is coupled to the primary winding of the transformer 212.

Switch 216 has a first terminal coupled to node 256, and a second terminal coupled to a sixth node 260, which in turn is coupled to node 252. In this embodiment, switch 216 may be a MOSFET transistor having a source coupled to node 260, and a drain coupled to node 256. A gate of this transistor is coupled to receive the control signal S1 from the precharge controller 108 (FIGS. 1 and 2). Second switch 218 has a first terminal coupled to node 258 and a second terminal coupled to node 232. In this embodiment, second switch 218 may be a MOSFET transistor having a source coupled to a sixth node 260 and a drain coupled to node 258. A gate of this transistor is coupled to receive control signal S2 from the precharge controller 108 (FIGS. 1 and 2). A secondary winding of the first transformer 212 is coupled to a rectifier circuit 222. Output voltage $V_{OUT}$ applies across a second capacitor 224 (nodes 262 and 264).

The operation of the isolated boost control circuit 114 will now be described during both normal and precharge operations. Output voltage $V_{OUT}$ across the capacitor 224 may be, for example, about 300 volts. If the transformer 212 is a 6:1 transformer, the 300 volts on the secondary winding of the transformer 212 will be approximately 50 volts on the primary winding of the transformer 212 and on the first and second inductors 210 and 214. During normal operation, both the first and second switches 216 and 218 are on and the voltage on the primary winding of the transformer 212 will be virtually zero. During this time, current in both the first and second inductors 210 and 214 will start to ramp up. If switch 216 is off, the current to the first inductor 210 cannot go to ground and instead goes through the transformer 212. During this time, the voltage across first inductor 210 is approximately 50 volts at node 256 and only approximately 14 volts at node 254. The voltage across inductor 210 increases to approximately 36 volts in order to forward bias the rectifier circuit 222 and provide current to capacitor 224. This results in the rate of the ramping up of current on the first inductor 210 to decrease. When the first switch 216 is on again, the rate increases again.

Similarly, when the second switch 218 is off, the current in inductor 214 starts flowing through transformer 212 and though the first switch 216 to ground. During this time, inductor 214 has applied approximately 14 volts at node 254 and approximately 50 volts at node 258. The voltage across inductor 214 increases to approximately 36 volts and, as a result, discharges into capacitor 224. This causes a rate of the ramping up of the current on inductor 214 to decrease. Switch 216 is turned on again, and the rate increases again. Accordingly, the process of turning the first and second switches 216 and 218 on and off results in boosting the charge stored on capacitor 224 ($V_{OUT}$).

During precharge condition, there is essentially no voltage stored on capacitor 224. Switches 216 and 218 are turned on, which causes the current in the first and second inductors 210 and 214 to ramp up. However, when switch 216 is turned off, there is virtually no voltage across transformer 212. Some charge is transferred through transformer 212 and rectifier circuit 222, and into capacitor 224, typically in the order of 0.5 to 1 volts. The current in inductors 210 and 214 continues to ramp up, even with the switch 216 is off. When the current in inductors 210 and 214 reaches the $I_{LIMIT}$, both switches 216 and 218 are turned off, which forces the current towards zero (see also, FIGS. 3 and 4).

Switches 216 and 218 are then turned on again and current begins to rise in the inductors 210 and 214. At this point, some charge remains in capacitor 224 that produces at least some voltage. The process is repeated until the voltage across capacitor 224 is sufficient to keep the voltage across inductors 210 and 214 from becoming too high.

Figure 5:
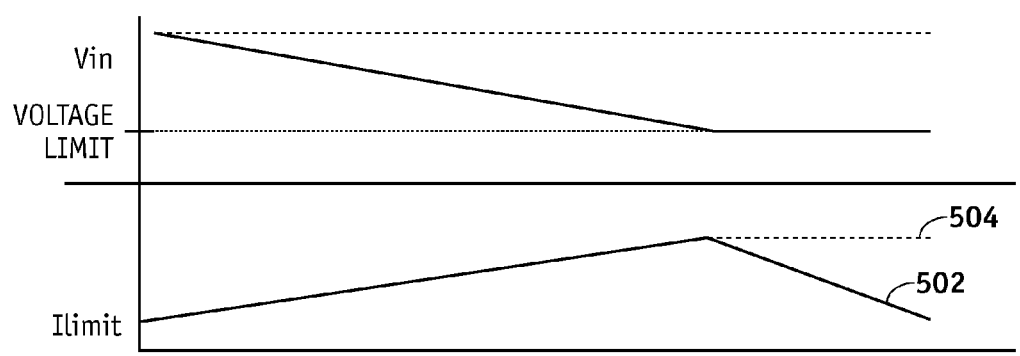
FIG. 5 is a diagram illustrating the relationship between input voltage $V_{IN}$ and $I_{LIMIT}$ in the system of FIG. 1.

FIG. 5 illustrates the relationship between the input voltage $V_{IN}$ and the $I_{LIMIT}$. As $I_{LIMIT}$ increases, the input voltage $V_{IN}$ decreases. As discussed above in reference to FIG. 3, $I_{LIMIT}$ affects the boost rate of the output voltage $V_{OUT}$ (and as a result, the depletion rate of the voltage source providing $V_{IN}$) by dictating the frequency at which the switching signals S1 and S2 that manipulate switches 216 and 218 are disabled. As noted above, the switching signals S1 and S2 are disabled when the ramp current (IL1) exceeds $I_{LIMIT}$. As such, a higher $I_{LIMIT}$ results in a less frequent disabling of the switching signals S1 and S2, an increased boost rate of the output voltage $V_{OUT}$, and an increased depletion rate of the input voltage $V_{IN}$. Conversely, a lower $I_{LIMIT}$ results in a more frequent disabling of the switching signals S1 and S2, a decreased boost rate of the output voltage $V_{OUT}$, and a decreased depletion rate of the input voltage $V_{IN}$.

As noted above in reference to FIG. 1, the microprocessor 102 monitors the input voltage $V_{IN}$ and provides the $I_{LIMIT}$ to the precharge controller 108. The microprocessor 102 selects a relatively low initial $I_{LIMIT}$, and thereafter, increases the $I_{LIMIT}$. In one embodiment, the $I_{LIMIT}$ is increased in a linear manner, although the $I_{LIMIT}$ can be increased in any suitable manner. The microprocessor 102 allows $I_{LIMIT}$ to increase so long as the input voltage $V_{IN}$ does not drop below a predetermined threshold. The threshold of the input voltage $V_{IN}$ can be, for example, nine volts. When microprocessor determines that the input voltage $V_{IN}$ reaches the predetermined threshold (labeled voltage limit in FIG. 5), the microprocessor 102 halts further increase of the $I_{LIMIT}$ (line 504) or decreases the $I_{LIMIT}$ (line 502). This enables an optimal $I_{LIMIT}$ that provides a more efficient precharge of the boost converter circuit 114 while preventing depletion of the voltage source.

This may eliminate the need for a fast control voltage loop, or other types of dedicated additional components to monitor $V_{IN}$ and adjust $I_{LIMIT}$. Moreover, this may reduce the demand on the microprocessor 102 since, while the $I_{LIMIT}$ is increasing relatively slowly, the rate of change of the input voltage $V_{IN}$ is limited. As such, the set of instructions in the microprocessor 102 can be executed less frequently and still maintain adequate control of the input voltage $V_{IN}$.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for precharging a DC to DC power converter that includes a boost circuit for generating a boosted output voltage from an input voltage, the method comprising:
   monitoring the input voltage;
   comparing a current in the boost circuit to a predetermined current limit; and
   increasing the current limit when the input voltage is greater than a predetermined value.

2. The method of claim 1, further comprising decreasing the current limit when the input voltage falls below the predetermined value.

3. The method of claim 1, further comprising maintaining the current limit when the input voltage falls below the predetermined value.

4. The method of claim 1, wherein the increasing step includes increasing a boost rate at which the DC to DC converter boosts the input voltage as the current limit increases.

5. The method of claim 1, wherein the monitoring step includes monitoring the input voltage with a microprocessor, and the method further comprises providing the current limit with the microprocessor.

6. The method of claim 1, further comprising selecting an initial current limit such that the input voltage is greater than the predetermined value.

7. The method of claim 1, wherein the increasing step includes increasing the current limit linearly.

8. The method of claim 1, wherein the predetermined value is 9 V.

9. A DC to DC power converter system, comprising:
   a boost converter circuit having an input configured to receive and boost an input voltage to generate an output voltage based on a current in the boost converter circuit;
   a precharge controller coupled to the boost converter and configured to measure the current of the boost converter circuit, the precharge controller further configured to receive a predetermined current limit, compare the current to the current limit, and control the boost converter circuit based on the comparison of the current to the predetermined current limit; and
   a microprocessor coupled to the precharge controller and the boost converter, the microprocessor configured to monitor the input voltage, provide the current limit to the precharge controller, and to increase the current limit when the input voltage is above a predetermined value.

10. The system of claim 9, wherein the microprocessor is further configured to decrease the current limit when the input voltage falls below the predetermined value.

11. The method of claim 9, wherein the microprocessor is further configured to maintain the current limit when the input voltage falls below the predetermined value.

12. The system of claim 9, wherein the boost converter circuit includes at least two switches that are configured to be manipulated by the control signals to boost the input voltage to the output voltage.

13. The system of claim 12, wherein the microprocessor is configured to select an initial current limit such that the input voltage is greater than the predetermined value.

14. The system of claim 9, wherein microprocessor is configured to the increase the current limit linearly.

15. The system of claim 9, wherein the predetermined value is 9 volts.

16. The system of claim 9, wherein the output voltage is 320 volts.

17. The system of claim 9, further comprising a voltage source coupled to the boost converter and providing the input voltage to the boost converter.

18. The system of claim 17, wherein the voltage source is an automobile battery.

19. A DC to DC power converter system, comprising:
   a boost converter circuit having an input configured to receive an input voltage, the boost converter circuit including at least two switches and being configured to boost the input voltage into an output voltage based on switch control signals,
   a precharge controller coupled to the boost converter circuit and configured to provide the switch control signals to the boost converter circuit based on a current limit representing a limit on a current in the boost converter circuit; and
   a microprocessor coupled to the precharge controller and configured to provide the current limit to the precharge controller, the microprocessor further configured to monitor the input voltage, increase the current limit when the input voltage is above a predetermined value, and decrease the current limit when the input voltage is at or below the predetermined value.

20. The system of claim 19, further comprising voltage source coupled to the boost converter and providing the input voltage to the boost converter, the voltage source including an automobile battery.

* * * * *